Jan. 5, 1965  R. ARNAUD  3,164,046
METHOD AND APPARATUS FOR AUTOMATICALLY CUTTING A STRIP OF GLASS
Filed June 14, 1960  3 Sheets-Sheet 1

INVENTOR.
ROBERT ARNAUD
BY Bauer and Seymour
ATTORNEYS

Jan. 5, 1965    R. ARNAUD    3,164,046
METHOD AND APPARATUS FOR AUTOMATICALLY CUTTING A STRIP OF GLASS
Filed June 14, 1960    3 Sheets-Sheet 2

*INVENTOR.*
ROBERT ARNAUD
BY Bauer and Seymour
ATTORNEYS

United States Patent Office 3,164,046
Patented Jan. 5, 1965

3,164,046
METHOD AND APPARATUS FOR AUTOMATI-
CALLY CUTTING A STRIP OF GLASS
Robert Arnaud, La Celle-Saint-Cloud, France, assignor to Compagnie de Saint-Gobain, Neuilly-sur-Seine, Seine, France
Filed June 14, 1960, Ser. No. 36,036
Claims priority, application France June 19, 1959
20 Claims. (Cl. 83—7)

This invention relates to an apparatus for and a method of cutting a sheet of glass into pieces. The invention displays particular advantages in connection with the cutting of a strip of glass travelling in the direction of its length into elements of definite length. The invention has wide utility and is applicable to the cutting of plates and sheets or tubes of all materials, metallic, organic and vitreous.

In prior methods for cutting strips of glass into pieces a cutting or scoring tool such as a diamond or a small cutting wheel is used to mark the cutting line on the glass with the aid of an elongated scale such as a wooden measuring stick which is placed upon the glass. Alternatively, there has been employed a measuring wheel driven by frictional contact with the glass as the latter travels therepast, the measuring wheel being connected to a controller which automatically starts the cutting tool in an operative cutting stroke after the measuring wheel has rotated through a predetermined angle. Both such prior methods have not been entirely satisfactory because it has not been possible to determine the cutting length accurately. In the first such method, employing a measuring scale such as a wooden rule, the lack of precision is due to the operator. In the second such method, wherein a wheel rolls along the glass and actuates a contact, the lack of accuracy is due mainly to the difficulty of adjusting the contact. Ordinarily, in the latter method it is necessary to employ a number of trial cuts before the desired length of cut is obtained.

The apparatus and method of the present invention avoid the above described difficulties experienced with prior art methods. The apparatus of the invention consists of the combination of an automatic system for marking the cutting line on the glass and a graduated scale or rule, carried along by the strip of glass, upon which the cutting length is marked, and a cutting or scoring tool which starts tracing operations when the scale has travelled over the cutting length thus marked. The cutting length is thus positively defined, and successive cutting operations are carried out each time the strip of glass has advanced through a very precise predetermined length relative to the cutting tool, which is exactly the cutting length desired.

An illustrative apparatus in accordance with the invention consists essentially of a graduated rule supported by a carriage which is moved along by the strip of glass, and of a cutting tool supported by a running bridge. The running bridge is at right angle to the direction of the displacement of the strip; and the bridge is carried along either directly by said strip of glass or indirectly by the carriage.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference to this latter purpose being had primarily to the appended claims.

In the drawings, wherein like reference characters refer to like parts throughout the several views, FIG. 1 is a fragmentary view in side elevation of a preferred embodiment of apparatus in accordance with the invention, certain of the parts being broken away for clarity of illustration;

Figure 1:
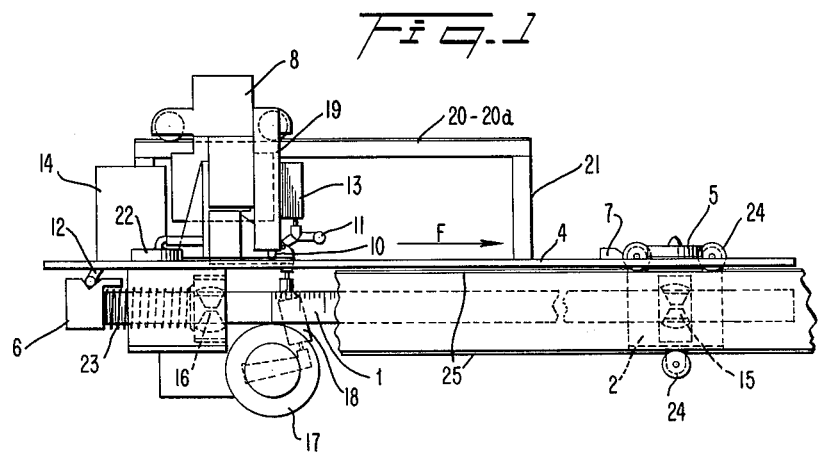
Figure 2:
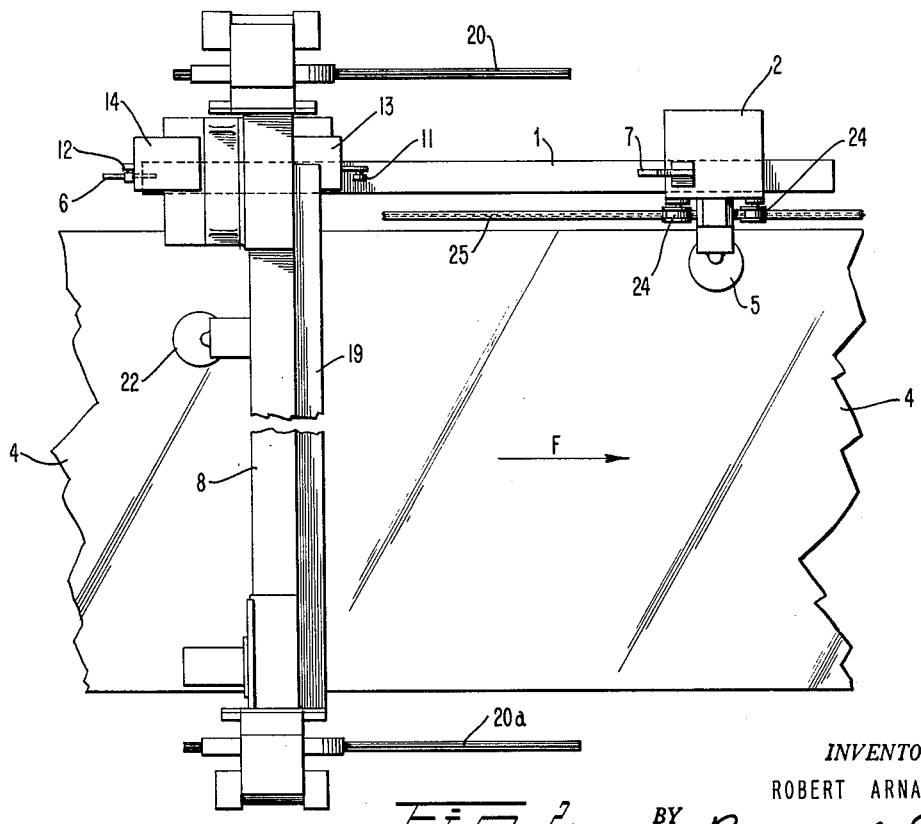
FIG. 2 is a fragmentary view in plan of the portion of the apparatus shown in FIG. 1.

Turning now to the drawings, a preferred illustrative embodiment of apparatus in accordance with the invention is shown in FIGS. 1 and 2. In such figures a strip of glass 4 is shown as being displaced to the right in the direction F. Strip 4 is supported as by rollers (not shown) during such travel. Tracks 25 are disposed along one side edge of the glass strip and parallel thereto. A carriage 2 is mounted for reciprocation along tracks 25 on rollers 24 as shown. A graduated rule or scale 1 in the form of a tube is positioned laterally beyond and parallel to the strip of glass. Rule 1 is mounted for sliding movement within carriage 2 on a roller guide 15. Carriage 2 may be releasably secured to scale 1, in any desired position of adjustment therealong, by means of a setscrew 3 carried by the carriage.

Mounted on rails 20, 20a disposed for translation on and along each side of strip 4 and parallel to guides 25, is a bridge 8 which extends transversely across glass strip 4. The rear end of scale 1 extends through one end of bridge 8 (the upper end in FIG. 2) and is slidingly mounted therein by a roller guide 16. The left hand end of scale 1 carries an enlarged head 6, there being a shock absorbing coil compression spring 23 interposed between head 6 of the scale and the bridge 8.

The head 6 on rule 1 has a transversely extending V-groove or cam in its upper surface. Secured to the left hand edge of carriage 2 is a similar V-grooved block 7. Secured to the right and left hand edges of bridge 8, respectively, are selectively operable locking bolts 11 and 12 which may be lowered in order to lockingly engage within the V-grooves of members 7 and 6 respectively or raised so that they are free from such members. The locking bolts may be operated between their aforesaid locking and released positions, by known pneumatically-controlled means indicated generally at 13, 14, respectively, so that the bridge 8 can be locked either to the scale 1 by means of the cam-bolt combination 6, 12 or to the carriage 2 by means of the cam-bolt combination 7, 11.

The pneumatic devices 13, 14 are jacks put into operation by adjoining electrical valves and interrupter (not shown). Thus when the cam 7 of the carriage is about to be engaged by bolt 11, the cam 7 touches an electrical interrupter which energizes an electrically operated valve (not shown). Compressed air from a source (not shown) is then sent into the jack 13 and the bolt is thus lowered and held in the root of the V groove of element 7 to thus releasably lock bridge 8 to carriage 22 so that they are constrained to move as a unit in the direction of movement of sheet 4. The displacement of the carriage 2 in the direction for the advancing strip of glass 4 is brought about by a suction disc 5 or a pad on the carriage and which overlies the glass 4. This suction disc or pad may be selectively raised and lowered so as to be released from or connected to the glass 4. Return of carriage 2 to bridge 8 is brought about by a wheel having a pneumatic tire 17. Such wheel may be swiveled toward and away from the rule 1 by means of a pneumatic jack 18. When the wheel is pressed against rule 1 and is driven in a counterclockwise direction, the scale 1 and carriage 2 may be impelled rearwardly of the glass strip, assuming that the suction cup 5 has been released from the glass. In commercial installations of the apparatus, it is preferred that the controls of the pneumatic jacks 13, 14 and 18 be automatic and synchronized, so that the apparatus automatically repeatedly carries out the sequence of operations now to be described in connection with FIGS. 3 to 6, inclusive.

Bridge 8 carries a retractible suction disk pad 22 which can either be lowered to connect the bridge to the strip of glass 4 to cause the two to travel together, or raise to disconnect the bridge from the glass. As above noted, bridge 8 is guided for movement above and parallel to glass strip 4 by guide rollers resting upon guide rails 20, 20a which are supported on opposite sides of the glass strip by supporting brackets such as that shown at 21 in FIG. 1. When bridge 8 is secured to carriage 2 by locking bolt 11 and grooved element 7, the bridge and carriage travel together. Bridge 8 is returned to a starting position by power means described hereinafter. The above described helical spring 23 avoids mechanical shock when the bolt 12 locks into the grooved element 6. The cutting tool 10 is mounted for travel along the length of bridge 8 by being mounted on suitable guide means running in a guideway on the bridge as described hereinafter.

Figure 3:
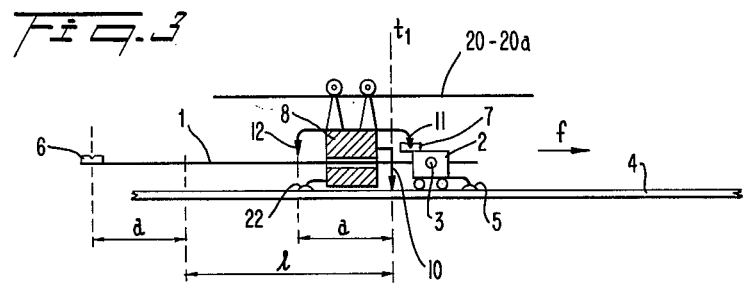
FIG. 3 is a schematic view in side elevation of the apparatus of FIGS. 1 and 2, the apparatus being shown in position to make a first transverse cut across the glass strip.
Figure 4:
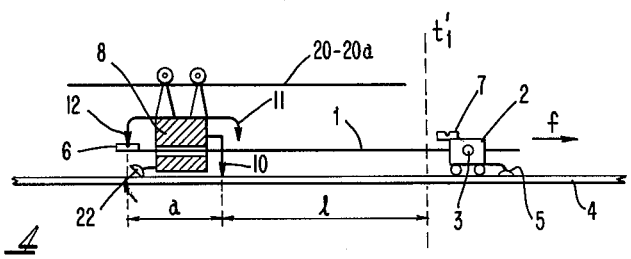
FIG. 4 is a view similar to FIG. 3 but showing the apparatus an appreciable time after the first cut has been made, the travelling bridge having been displaced rearwardly along the glass strip.
Figure 5:
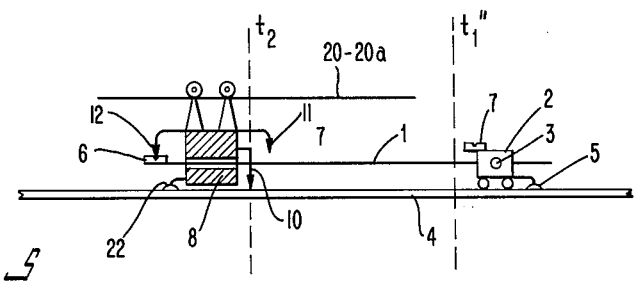
FIG. 5 is a view similar to FIG. 4, but showing the apparatus at a time subsequent to that in FIG. 4, the travelling bridge being now secured to the glass strip.
Figure 6:
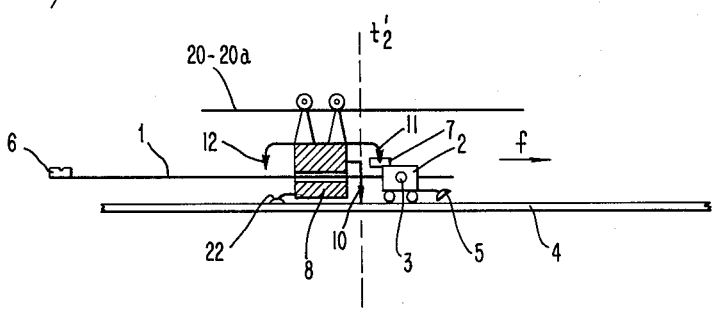
FIG. 6 is a schematic view of the apparatus in a fourth position of its operating cycle, the parts of the apparatus having been returned to the same relative position as that shown in FIG. 3, the cutting tool being engaged in making a second cut.

Tubular scale 1 is graduated in units of length with zero graduation at the point intersected by a plane normal to the plane of FIG. 4 and passing through cutter 10. The zero graduation is thus located the distance $a$, FIG. 4, forwardly of the notch in head 6. Since the graduations extend from this zero mark forwardly, that is, in the direction of travel of sheet 4, and, as previously explained, carriage 2 may be releasably secured by setscrew 3 in any one of an unlimited number of positions on and along the scale, the selected distance between successive cuts or scores on sheet 4 is determined by the fixing of carriage 2 to scale 1 in a position indicated by the graduations thereon. This distance is indicated at $l$, FIG. 4, and, clearly, for any given adjusted position of carriage 2 on and along scale 1, is the distance between the two positions of cutting wheel 10, first when bridge 8 is locked to carriage 2 by engagement of bolt 11 in the notch in block 7, as shown upon FIGS. 3 and 6, and, secondly, when bridge 8 is locked by engagement of bolt 12 within the notch in head 6 fixed to the rearward end of scale 1.

FIGS. 3–6, inclusive, show successive positions of the parts in the making of two adjacent cutting or scoring operations. In FIG. 3 the carriage 2 and the bridge 8 are shown connected by the bolt 11 and the grooved element 7. With the parts in such connected relationship, the suction cup 5 on the carriage 2 is lowered to connect the carriage to the moving glass strip 4. With the parts in such position, and while they are moving with the glass, the tool 10 is traversed along the bridge 8 to make a first score line $t_1$ thereon.

Following the first scoring operation, and while the carriage 2 remains attached to the glass strip by the suction cup 5, bolt 11 is released from grooved element 7 and the bridge 8 is moved rearwardly of the glass strip, as by operation of the above mentioned power means and described hereinafter. During this portion of the cycle, because of the continued movement of glass strip 4 to the right, the initial score line will have moved to the right to the position $t_1'$.

The bolt 12 will have secured the bridge 8 to the scale 1 by interaction with grooved element 6. Suction cup 22 will now be lowered into contact with the glass strip. The scoring tool 10 will now occupy the position $t_2$, which lies a distance $l$ from the previously made score line, which now occupies the position $t_1'$.

Locking bolt 12 will now be raised, as will suction cup 5 on carriage 2. The carriage 2 and the scale 1 attached thereto are then moved rearwardly with respect to the glass strip 4 by means of the above described rubber tired wheel 17 so that they again assume the relative positions shown in FIG. 3, that is, so that the carriage 2 lies adjacent to the bridge 8 and is connected thereto by elements 7, 11. Suction cup 5 may again be lowered to connect the carriage to the glass strip. As the carriage and bridge move with the strip, the cutting tool 10 will again be operated to form a second score line $t_2'$ on the glass strip. Cutting or scoring tool 10 may be operated to make the second score line at distance $l$ rearwardly of the first line, at any time after bridge 8 has been retracted rearwardly relatively to carriage 2 and locked in retracted position by engagement of bolt 12 in the notch in head 6.

The carriage 2 may also be placed on the other side of bridge 8 to avoid that said carriage be placed after a scoring mark. The operations are similar but symmetrical to those described, as if the direction of the arrow F were reversed.

Figure 7:
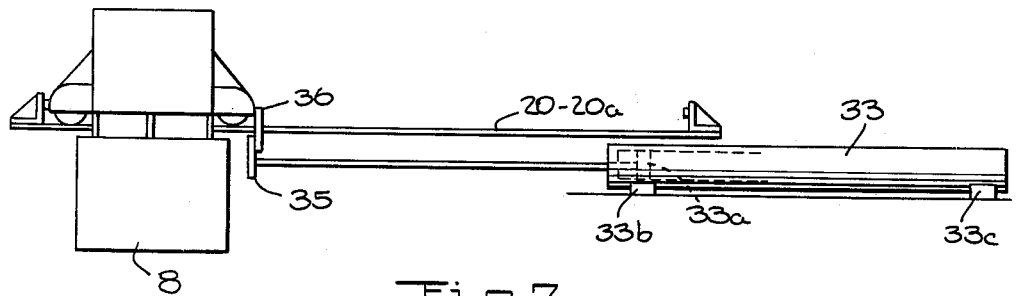
FIG. 7 is a fragmentary view in side elevation of the apparatus for moving the bridge mechanism rearwardly of the path of travel of the glass strip.

In FIG. 7 there is shown a mechanism for moving the bridge 8 rearwardly of the glass strip 4. Fixedly mounted adjacent the rails 20–20a is a hydraulic cylinder 33 having a piston 33a therein. One end of a piston rod extends into cylinder 33 and is secured to piston 33a. The other end of rod 34 has secured to it a dog 35 which engages a dog 36 which is secured to bridge 8. Cylinder 33 has ports 33b and 33c at opposite ends. Port 33c is always open to the atmosphere. Port 33b is connected to an electrically operated valve (not shown) which selectively connects said port to either the atmosphere or to a source of compressed air (not shown). When the port 33b is connected to a source of suction, the piston 33a and its rod 34 will be moved to the left, as shown in FIG. 7, and thus in turn force the bridge 8 rearwardly of the direction of travel of the glass strip 4. When the electrically operated valve connects port 33b to the atmosphere, the bridge 8 is free to move with the glass strip.

Figure 8:
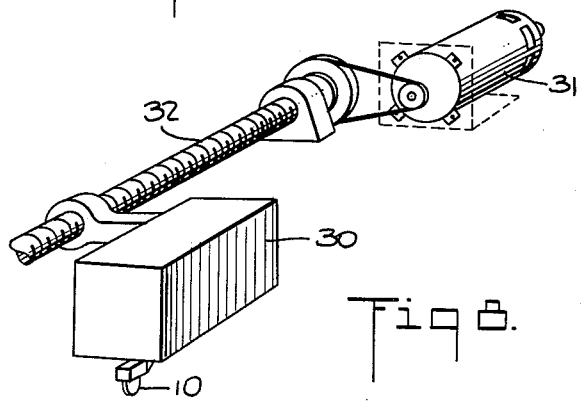
FIG. 8 is a perspective view of the mechanism for mounting and moving the cutting tool on the bridge mechanism.

In FIG. 8, the cutting wheel 10 is shown mounted in a frame 30 which in turn is threadedly engaged to a worm 32 which extends across the length of the bridge 8. A reversible motor 31 is suitably connected to one end of worm 32 so that upon operation of the motor the worm 32 rotates and in turn causes the frame 30 and the cutting wheel 10 to move along the length of the bridge 8. The cutting wheel 10 is mounted by conventional means in the frame 30 so that it will, upon actuation of suitable controls (not shown), move down into contact with the glass strip 4 and into operative position. The frame 30 also contains suitable controls (not shown) so that when the cutting wheel 10 reaches the opposite edge of the glass strip the wheel is raised above the surface of the strip and at the same time actuates controls to reverse the motor 31 to return the cutting wheel 10 and the frame 30 to its starting position at the other side of the glass strip. The cutting tool operation is as follows for one complete cycle: The tool is lowered into contact with the glass strip and the motor 31 is started, when the tool reaches the other side of the glass strip it is raised above the surface of the strip and at the same time actuates means (not shown) for reversing the motor to return the tool and the frame 30 to its starting position with the tool remaining in its raised position.

Figure 9:
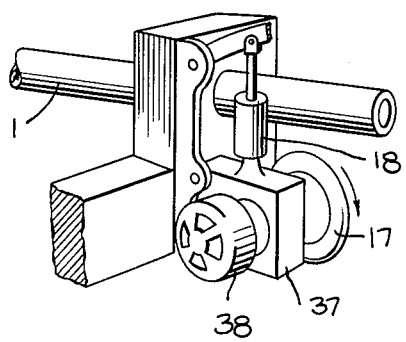
FIG. 9 is an enlarged perspective of the mechanism for mounting and operating the wheel for moving the measuring scale relative to the path of movement of the glass strip.

In FIG. 9 there is shown a mechanism for mounting and operating the rubber tired wheel 17. Wheel 17 is directly connected to the shaft of an electric motor 38 and both wheel 17 and motor 38 are mounted in a block 37 which is moved toward and away from the scale 1 by operation of the hydraulic jack 18.

To start the operation of the mechanism the bridge 8 is carried along with the glass strip through the operation of suction cup 22. As bolt 11, carried by bridge 8, nears contact with groove in block 7 on the carriage 2 it actuates an electrical interrupter which in turn energizes an electrically operated valve connected with jack 13 for causing compressed air to enter and causing bolt 11 to be lowered into contact with groove 7. When the bolt 11 is lowered into the groove of element 7, the suction cup 5 is moved down into engagement with the top of the glass strip. At this point a circuit is closed to start one complete cycle of operation of the cutting tool as described above. In such position the carriage 2 and the bridge 8 are locked together and are moved with the glass strip 4 and at the same time the tool 10 is traversed along the bridge 8 to make the first score line $t_1$. When the motor 31 is reversed to bring the cutting wheel 10 back to its original starting position, it actuates the electrical interrupter which de-energizes the electrically operated valve associated with bolt 11 thus releasing bolt 11 from engagement with the grooved element 7. At the same time the electrically operated valve associated with the cylinder 33 is reversed to allow suction from a source (not shown) to be sent into the cylinder 33 through port 33b which in turn through the piston rod 34 and dog 35 moves the bridge 8 rearwardly of the glass strip. As the bridge 8 is moved rearwardly and as the bolt 12 approaches the groove 6, it contacts an electrical interrupter which energizes an electrically operated valve (not shown) and compressed air is then sent into the jack 14 and the bolt 12 is lowered into the groove of element 6. At the same time the electrical valve associated with port 33b is actuated to connect port 33b with the atmosphere so that bridge 8 is free to move with the glass strip. When bolt 12 is secured to groove 6, the bridge 8 and the scale 1 are secured together. At the same time that bolt 12 engages groove 6 the suction cup 22 is lowered into contact with the top of the glass strip. When the suction cup 22 is in contact with the glass strip such position causes the de-energization of the electrically operated valve for the jack 14 thus causing the locking bolt 12 to be raised and at the same time causing the suction cup 5 on the carriage 2 to be raised from contact with the glass strip. At the same time, the hydraulic jack 18 is actuated to move the wheel 17 into contact with the measuring scale 1 and to start the electric motor 38 to cause rotation of the rubber tired wheel 17. This causes the measuring scale 1 to move rearwardly carrying with it the carriage 2 with respect to the glass strip 4. As the carriage 2 and its attached groove element 7 approach the bolt 11, the cycle of operation is repeated so that the bolt 11 is lowered into groove 7 which in turn causes the suction cup 5 to move down into engagement with the top of the glass sheet 4 which in turn initiates the movement of the cutting tool 10.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A method of cutting lengths of glass from a ribbon of glass moving in the direction of its length by means of a scoring tool mounted for travel along a guideway adapted to transverse the ribbon of glass and to be movable lengthwise of the ribbon, comprising directly securing to the ribbon a measuring means adapted to enter into locking engagement with the guideway before and after each measuring operation carried out by a relative displacement between the measuring means and the guideway over a predetermined distance corresponding to the required length of the piece of glass to be cut, securing the guideway directly to the glass ribbon and to the measuring means, to thereby position the scoring tool relatively to the glass ribbon for the cutting operation, moving the scoring tool along the guideway in contact with the glass for scoring the ribbon transversely while the guideway is directly secured to the glass ribbon, releasing the guideway from the ribbon and measuring means after the scoring tool has completed its movement across the ribbon, and moving the guideway through said predetermined distance along and relatively to the measuring means and ribbon while maintaining the measuring means directly fixed to the ribbon.

2. The method of automatically scoring an elongated strip of material moving forwardly in the direction of its length, to sever the same into a series of sections of predetermined lengths, comprising, aligning a measuring scale in parallel with said direction and causing it to travel as a unit with said material, aligning a scoring tool with a predetermined first position with respect to and adjacent one end of said scale and causing it to travel in such position as a unit with the scale and material, moving said cutting tool toward the other end of said scale while the scale is moving as a unit with said material, aligning said tool with a second position with respect to and along said measuring scale by a distance from said first position equal to said predetermined length and causing said tool to travel in said position as a unit with said material and scale, moving said scale relatively to said tool and the material traveling as a unit, until said scoring tool is re-aligned in said first position with respect to said scale and causing said scale to move in re-aligned position as a unit with said tool and material, and moving said scoring tool in a scoring stroke generally across the material, said last-named movement being initiated when said scoring tool, measuring scale and material are traveling together as a unit and ended while said tool is still moving as a unit with the material.

3. The method of cutting lengths of glass from a ribbon of glass moving in the direction of its length by means of a scoring tool mounted for travel along a guideway adapted to transverse the ribbon of glass and to be movable lengthwise of the ribbon, comprising securing directly to the ribbon a measuring scale adapted to enter into locking engagement with the guideway before and after each measuring operation performed by a relative displacement between the scale and the guideway along a predetermined distance corresponding to the required length of the piece of glass to be cut, securing the guideway and the scale each directly to the glass ribbon and to each other, starting the scoring tool along the guideway in contact with the glass for scoring the ribbon transversely, continuing movement of the scoring tool while the guideway remains secured to the ribbon, and releasing the guideway from its securement to the ribbon and scale after the end of the movement of the scoring tool across the ribbon for movement along the scale and ribbon through said predetermined distance while retaining the scale fixed to the ribbon.

4. The method of automatically transversely scoring an elongated material in the form of a strip, tube or the like, preferably of a glass strip moving forwardly in the direction of its length, into a series of pieces of material which comprises, aligning a measuring scale with the length of the material, securing the scale to the material to cause it to travel in synchronism therewith, securing a cutting tool to the scale at a precisely predetermined first position adjacent one end of the measuring scale and securing said tool to the material to cause it to travel in synchronism therewith, releasing the scale from its securement to the tool and the material and moving it in a direction opposed to the movement of the material while the scoring tool remains secured to the material, securing the scale to the cutting tool at a second precisely predetermined position adjacent the other end of said scale and securing said scale to the material, releasing the cutting tool from its securement to the scale and to the material and moving it toward the other end of said scale while the scale remains secured to the material, securing the cutting tool to the scale when it reaches the predetermined first position adjacent the end of the scale and securing it to the material, and starting the scoring operation by moving the cutting tool across the width of the material when the tool is secured to the scale and both tool and scale are secured to the material to move in synchronism therewith, continuing the scoring operation while the tool is secured to the material and ending said scoring operation before the tool is released from its securement to the material.

5. Apparatus for automatically cutting a strip of sheet glass traveling in a path comprising, a bridge confronting a broad surface of the strip of glass, means supporting the bridge for travel parallel to the path of travel of the glass strip, a cutting tool mounted on the bridge for movement therealong and across the travelling sheet of glass, a measuring scale lying parallel to the path of travel of the glass strip and slidably supported by the bridge, means to secure the bridge to the strip of glass so that the bridge is directly moved by the strip, means to secure the scale to the strip so that the scale is directly moved by the strip, and means to secure the scale to the bridge at two predetermined positions.

6. Apparatus according to claim 5, in which the means to secure the scale to the glass comprises a carriage supporting the scale at one extremity thereof, means to support the carriage for travel parallel to the path of travel of the glass strip, and means for selectively securing the carriage to the strip so that the carriage is directly moved by the strip.

7. The apparatus of claim 6, said last-named means comprising a suction cup secured to the carriage.

8. The apparatus of claim 6, last-named means comprising a pad secured to the carriage.

9. The apparatus of claim 6, means selectively to secure the scale to the carriage at a desired position longitudinally of the scale, and means slidably to mount the scale with respect to the bridge.

10. The apparatus of claim 6, said means to secure the scale to the bridge comprising two locking bolts supported by the bridge and operable to engage respectively and successively two cams, one on the carriage and the other fixed with the scale.

11. The apparatus of claim 5, said last-named means comprising first and second locking means each operable to secure the scale to the bridge at desired positions longitudinally of the scale, and means slidably to mount the scale with respect to the bridge.

12. The apparatus of claim 11, said second locking means including a carriage, and means for automatically actuating said first and second locking means to respectively lock the carriage to the bridge when such parts reach their relatively adjacent operating positions, and to lock the bridge to the scale when the scale its withdrawn therefrom to fix the bridge and carriage in their relatively remote operating positions.

13. The apparatus of claim 5, said means to secure the scale to the bridge comprising two locking bolts supported by the bridge to engage respectively and successively two cams provided at both extremities of the scale.

14. The apparatus of claim 13, and power-operated jacks connected with each of said locking bolts, respectively to operate the same.

15. The apparatus of claim 5 wherein said measuring scale comprises a graduated rod slidably mounted on the bridge, said means to secure the scale to the bridge in one said position including a carriage slidable along the rod and securable thereto at a selected position.

16. The apparatus of claim 15, means mounted on said rod for entering into locking engagement with the bridge so that the latter is entrained by the carriage through the intermediary of the rod.

17. The apparatus of claim 15, said carriage being provided with means adapted to enter into locking engagement with the bridge so that the latter is entrained directly by the carriage.

18. The apparatus of claim 16, said last-named means comprising a cam and said bridge being provided with two members engageable with a cam on the carriage and said cam on the rod, respectively.

19. The apparatus of claim 18, each said member being movable by a jack from a neutral position to a position wherein it contacts its associated cam.

20. Apparatus for automatically cutting a strip of sheet glass moving in a path comprising, a bridge confronting a broad surface of the strip of glass, means supporting said bridge for travel parallel to the path of travel of the glass strip, a cutting tool mounted on said bridge for movement therealong and across the moving sheet of glass, a measuring scale lying parallel to the path of movement of the glass strip and slidably supported by said bridge, means to secure said bridge to the strip of glass so that said bridge is directly moved by the strip, means to secure said scale to the strip so that said scale is directly moved by the strip, means to move said scale relatively to said bridge when the bridge is fixed with the glass, means to move said cutting tool across the strip and to return the same to its starting position, and means to move the bridge relatively to said scale when the scale is fixed with the glass.

References Cited in the file of this patent

UNITED STATES PATENTS

| 1,710,898 | Rowley | Apr. 30, 1929 |
| 1,720,546 | Drake | July 9, 1929 |
| 1,853,498 | Bliven | Apr. 12, 1932 |
| 2,058,307 | Gaskell | Oct. 20, 1936 |
| 2,530,511 | Danner | Nov. 21, 1950 |
| 2,943,393 | Insolio | July 5, 1960 |
| 3,027,646 | Brichard | Apr. 3, 1962 |